Nov. 23, 1937.   W. H. POTTHAST   2,100,267
ROTARY COMBUSTION ENGINE
Filed March 17, 1936   6 Sheets-Sheet 1

Inventor
W. H. Potthast.
By Lacey & Lacey,
Attorney

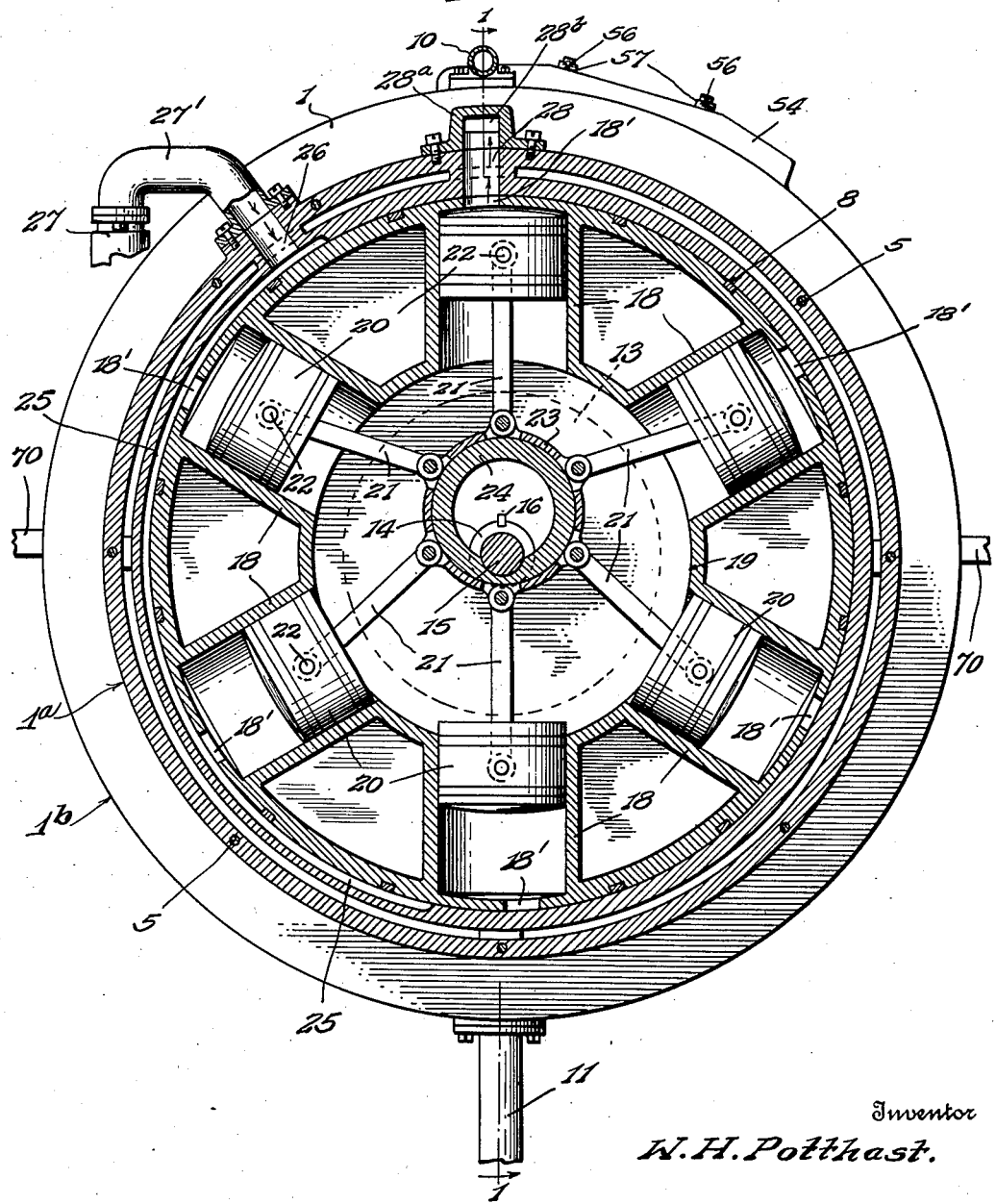

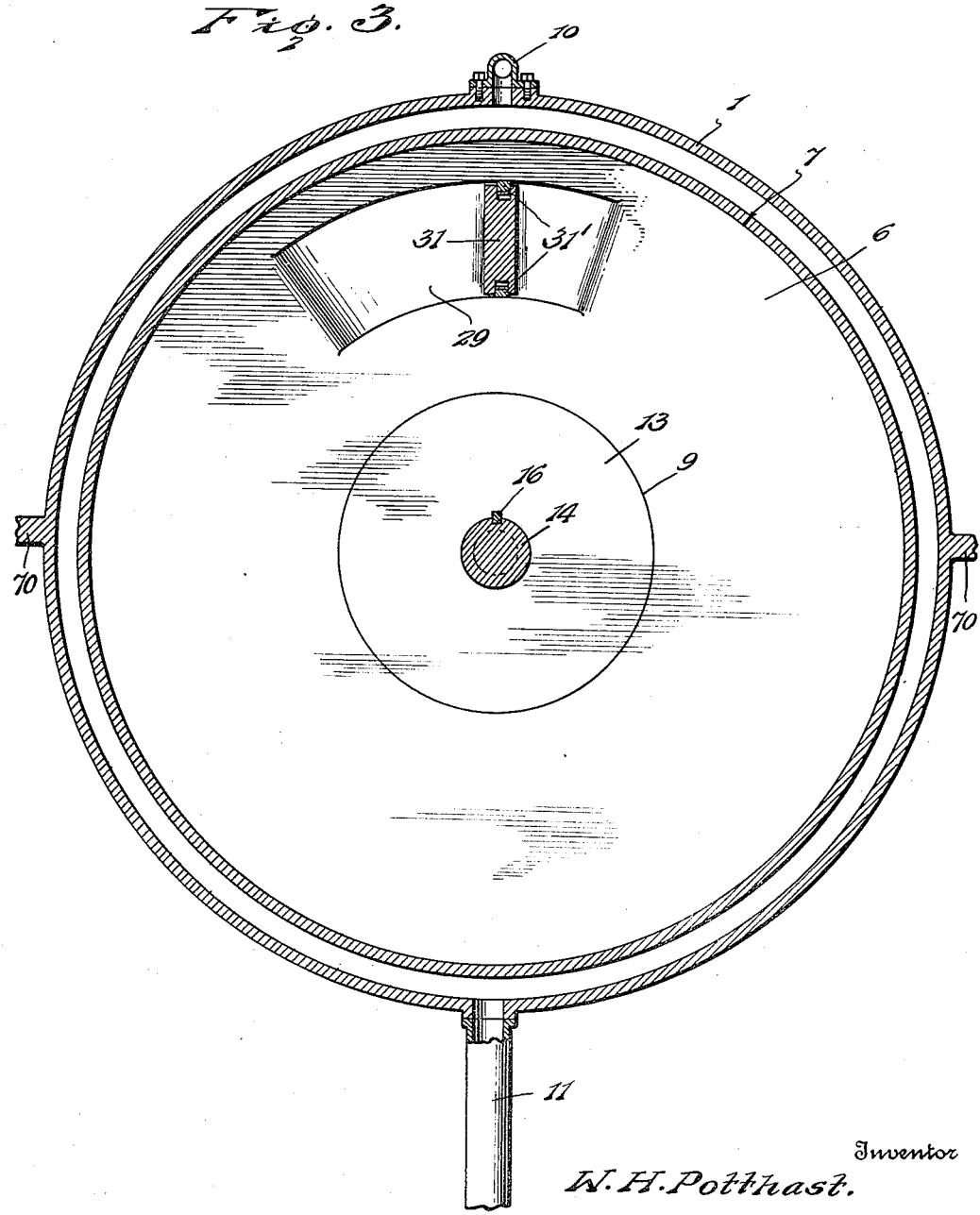

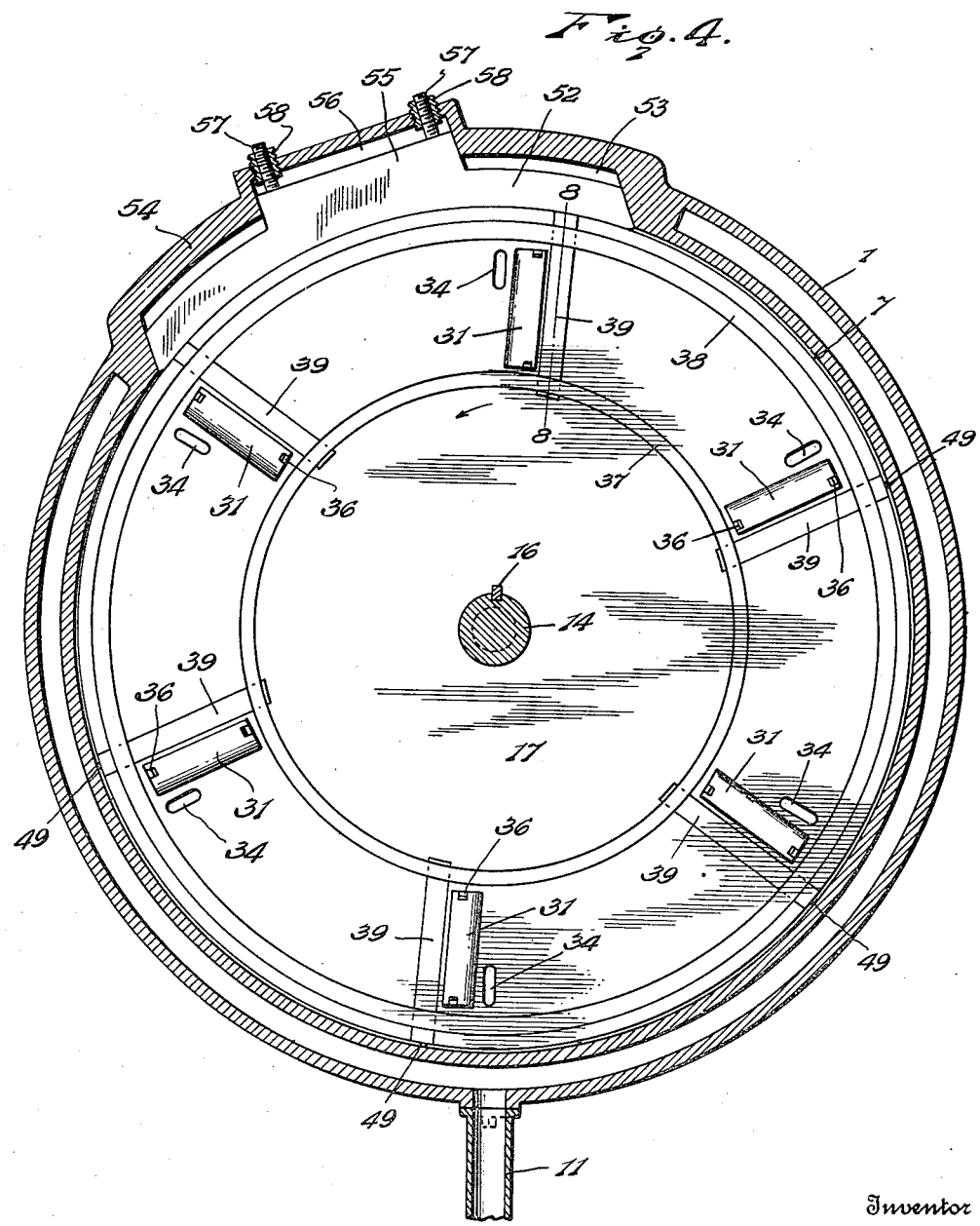

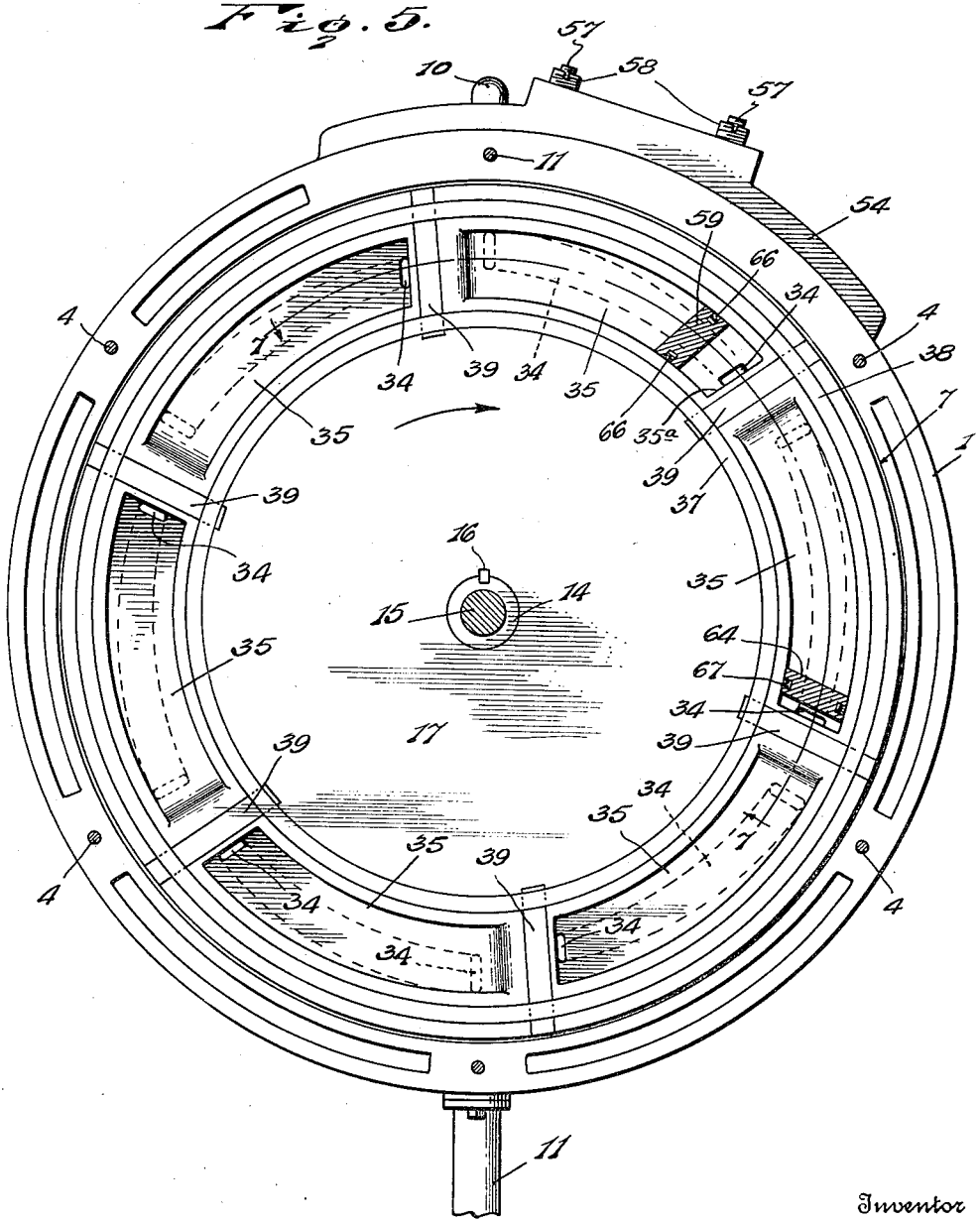

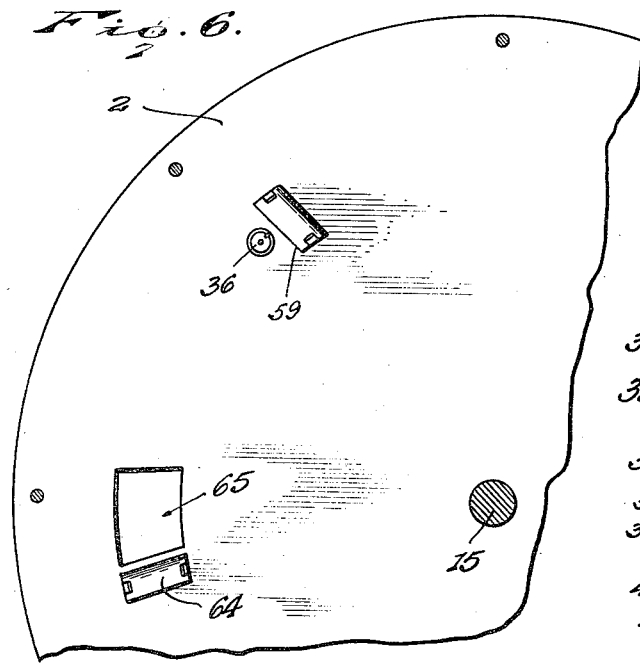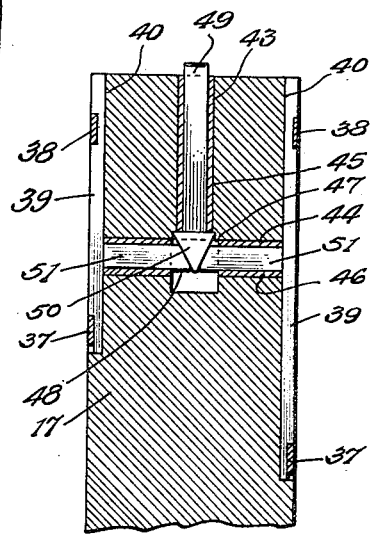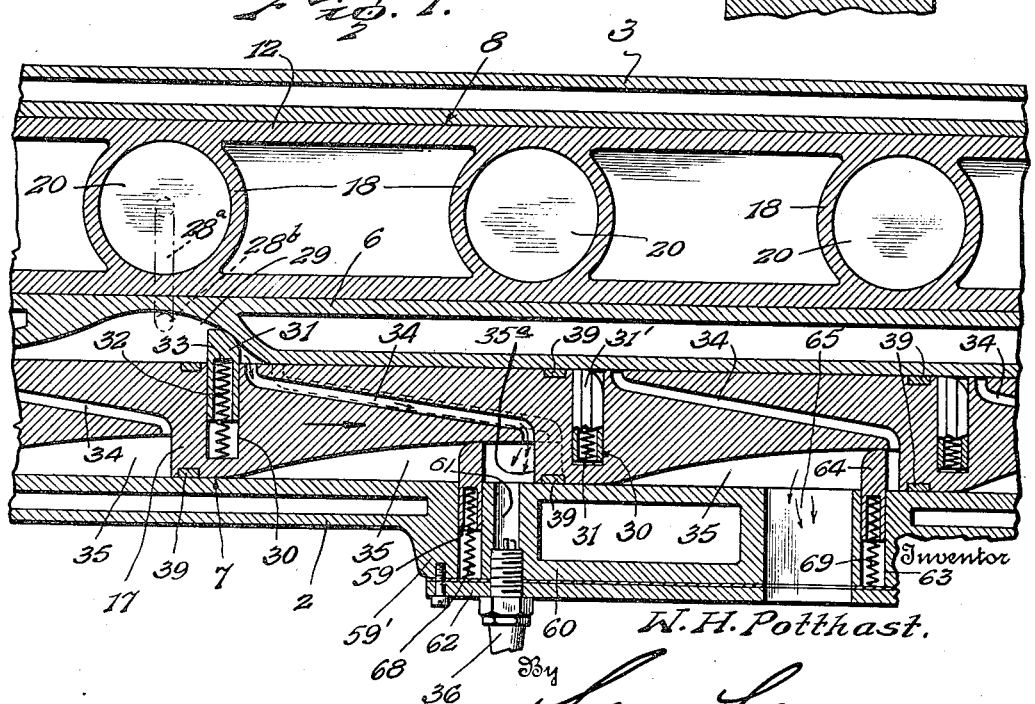

Patented Nov. 23, 1937

2,100,267

UNITED STATES PATENT OFFICE 2,100,267

ROTARY COMBUSTION ENGINE

Walter H. Potthast, Manning, Iowa

Application March 17, 1936, Serial No. 69,387

11 Claims. (Cl. 123—14)

This invention relates to an improved rotary internal combustion engine and one object of the invention is to provide an engine of the rotary type wherein a compressor is associated with a rotor in such a manner that charges of compressed fuel will be delivered into a combustion chamber by way of an intermediate chamber so that fuel delivered under compression into the intermediate chamber will be additionally compressed as it is delivered into the combustion chamber and thus the combustion chamber filled with very highly compressed fuel which will then be exploded and impart rotation to the rotor.

Another object of the invention is to so construct the engine that when it is in operation charges of compressed fuel will be successively delivered from cylinders of a compressor into a chamber formed in a partition separating the compressor from the rotor and transferred from this chamber, which may be referred to as an intermediate chamber, to combustion chambers formed in the rotor in the form of highly compressed fuel which will be exploded for imparting rotation to the rotor, delivery of the fuel into the intermediate chamber and from this chamber into the combustion chambers of the rotor taking place in proper sequence and timing as the rotor and the compressor are both keyed to the main shaft of the motor.

Another object of the invention is to so form the compressor that as it moves with the rotating shaft, pistons, which operate in the cylinders of the compressor, will have sliding movement transmitted to them through the medium of a cam surrounding the shaft and thus proper timing of the compressor assured.

Another object of the invention is to so form the rotor that correct feeding of compressed fuel from the intermediate chamber into the combustion chambers will take place and also the spent fuel properly fed out of the exhaust.

Another object of the invention is the provision of a rotary internal combustion engine which is of compact construction and formed of parts which are comparatively simple in their construction and not liable to get out of order.

The invention is illustrated in the accompanying drawings, wherein:—

Figure 2 is a sectional view taken at right angles to Figure 1 along the line 2—2 thereof and showing the compressor in section.

Figure 3 is a sectional view taken vertically through the engine along the line 3—3 of Figure 1 at the inner side of the rotor and looking towards the partition between the compressor chamber and the rotor receiving chamber of the engine casing.

Figure 4 is a sectional view through the rotor taken along the line 4—4 of Figure 1.

Figure 5 is a view taken vertically through the engine along the line 5—5 of Figure 1 and looking toward the outer face of the rotor.

Figure 6 is a fragmentary view through the motor taken along the line 6—6 of Figure 1.

Figure 7 is a sectional view taken circumferentially of the motor along the line 7—7 of Figure 5.

Figure 8 is a view upon an enlarged scale taken through the rotor radially thereof along the line 8—8 of Figure 4.

Figure 1:
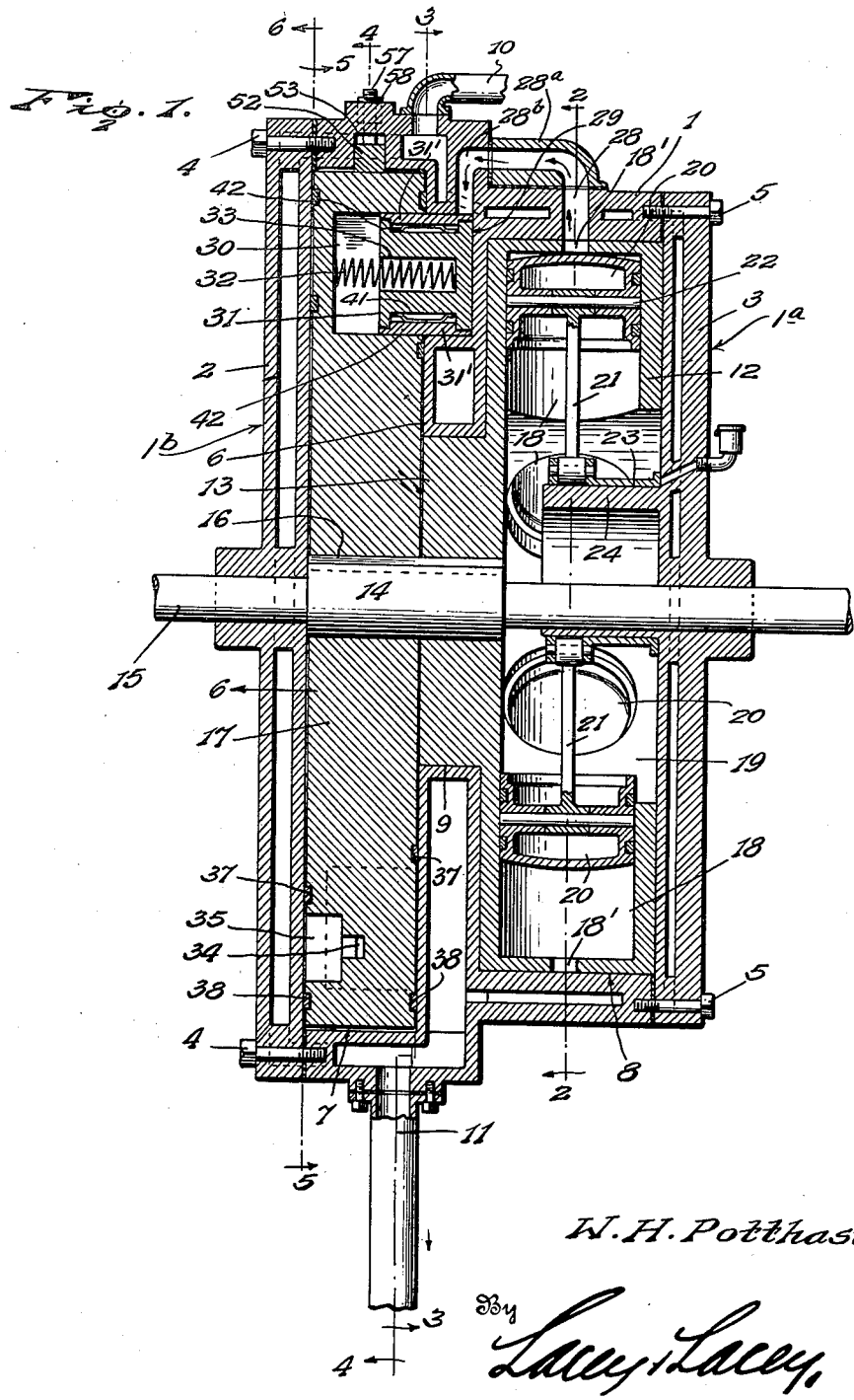
Figure 1 is a sectional view taken vertically through the engine, the view being along the line 1—1 of Figure 2.

This improved rotary combustion engine has a casing 1 which is of circular contour and closed at its front and rear ends by heads 2 and 3 detachably secured to walls of the casing by bolts 4 and 5, any number of which may be used. A partition 6 is formed within the casing intermediate its front and rear ends to define a rotor receiving chamber 7 at the front of the casing and a compressor receiving chamber 8 between the partition and the rear end of the casing and attention is called to the fact that this partition is formed with a central opening or passage 9 to rotatably receive a portion of the compressor. The rear portion 1$^a$ of the casing is of less external diameter than the forward portion 1$^b$ in which the rotor receiving chamber is formed and, therefore, the forward portion 1$^b$ of the casing projects radially from the annular wall of the rear portion 1$^a$, as shown in Figures 1 and 2. The walls, partition and heads of the casing are water-jacketed in the usual manner, a water outlet 10 being provided at the top of the casing and an inlet 11 at its bottom.

In order to compress the fuel, there has been provided a compressor mounted in the compressor receiving chamber 8 and having a circular block or body 12 formed of any desired metal and having at its inner side a hub 13 which fits snugly within the opening 9 of the partition 6 and secured to the thickened portion 14 of the engine shaft 15 by a key 16 which not only secures the block of the compressor to the shaft but also secures the rotor 17 and thus causes both the rotor and the compressor block to turn together with the shaft. A number of cylinders 18 are formed in the block 12 which extend radially of the block from a central chamber 19 formed concentric to the block and shaft 15 and while six of these cylinders have been shown in Figure 2, it will be understood that any number desired may be provided. Pistons 20 are slidably received in the cylinders and carry piston rods 21 which are pivoted to the pistons in the usual manner by pins 22, as shown in Figure 1, and project through the open inner ends of the cylinders into the chamber 19 with their inner ends pivotally connected with a ring 23. Upon referring to Figures 1 and 2 it will be seen that this ring 23 fits loosely about a cam 24 formed as a sleeve or collar which projects inwardly from the head 3 in eccentric relation to the shaft 15 so that as the block 12 turns with the shaft, the pistons will be reciprocated in the cylinders. Openings or ports 18' are formed at outer ends of the cylinders in offset relation to centers thereof and upon referring to Figure 2, it will be seen that as the compressor block turns and the pistons move towards inner ends of the cylinders, the ports 18' will be in registry with a groove or channel 25 formed partially about the annular wall of the compressor chamber and leading from an inlet port 26 through which fuel is fed from a carburetor or other suitable source of supply 27 through a pipe 27'. During inward movement of the piston, fuel will be drawn into the cylinders from the channel 25 and after each cylinder passes the lower end of this channel, the piston therein will be moved outwardly to compress the charge of fuel. This fuel will be highly compressed by the time a cylinder reaches the uppermost position shown in Figure 2 and when the cylinder is in this position its port will register with an outlet port 28 communicating with a conduit 28ª which extends across the outer face of the annular wall of the compressor and registers with a port 28ᵇ formed in the projecting portion of the rear wall of the rotor chamber. It will thus be seen that when the engine is in operation, successive charges of compressed gaseous fuel will be delivered from the compressor through the conduit 28ª to the port or passage 28ᵇ and through this passage into a fuel receiving pocket 29 formed in the front wall of the partition 6 and hereinafter referred to as an intermediate pocket.

The rotor 17 which is carried by the enlarged portion of the shaft and turns with the shaft in the rotor chamber 7 constitutes an outer wall for the intermediate chamber or pocket 29 and is formed with a plurality of pockets 30 which open through the rear face of the rotor, as shown in Figures 1 and 7. Plungers, wipers or vanes 31 are slidably mounted in the pockets 30 and urged outwardly by springs 32 housed in spring receiving sockets 33 formed longitudinally in the wipers and bearing against inner end walls of the pockets 30. Therefore, during rotation of the rotor, each plunger or wiper as it reaches the intermediate pocket or chamber 29 will enter this chamber and move longitudinally therein so that gas in the intermediate chamber will be forced through a passage 34 formed diagonally through the rotor and delivered into a combustion chamber 35 formed in the front face of the rotor. The wipers, passages 34 and combustion chambers correspond in number to the cylinders of the compressor and as the charges of fuel are delivered by the compressor into the intermediate chamber 29, they will be wiped out of this intermediate chamber 29 and forced through the passages 34 into the combustion chambers 35. The intermediate chamber 29 is of greater capacity than the combustion chambers 35 and, therefore, the charges of gaseous fuel delivered under compression into the intermediate chamber and forced from this chamber into the combustion chambers will be very highly compressed and exploded with great force when the spark plug 36 is energized. While one spark plug has been shown, it is to be understood that two may be provided if found necessary according to the speed at which the engine operates. Outer ends of the plungers or wipers are curved, as shown in Figure 7, so that the plungers may easily enter and leave the intermediate chamber and the inner wall of the intermediate chamber is curved, as shown in Figure 7, so that it gradually increases in depth from one end to the point in its length at which fuel is delivered into this chamber and then more abruptly decreases in depth towards the end approached by the wipers during rotation of the rotor.

It is necessary to prevent leakage of the gaseous fuel about the wipers and the rotor and, therefore, the wipers are provided with sealing strips 31' along their inner edge faces and the rotor is provided with sealing rings 37 and 38 extending circumferentially of the rotor at opposite side faces thereof and connected by radially extending strips 39 counter-sunk in grooves 40 formed in side faces of the rotor, as shown in Figure 8. The sealing strips 31' of the wipers are seated in grooves or pockets 41 formed in side edge faces of the wipers and urged outwardly by springs 42 so that they have close contacting engagement with walls of the pockets 30 and also with inner and outer arcuate walls of the intermediate chamber, as shown in Figure 1, and leakage of fuel past the wipers will be prevented as they move through the intermediate chamber and force this fuel through the passages 34 into the combustion chambers 35. Between opposed pairs of strips 39 the rotor is formed with intersecting passages 43 and 44 lined with metal tubing 45 and 46, openings 47 and 48 being formed in the tube 46 so that this tube communicates with the inner end of the companion tube 45 and also with the inner end portion of the passage 43. A plunger 49 is slidably mounted in each tube 48 and at its inner end is formed with a tapered head 50 engaged between beveled inner ends of plungers or projectors 51 which are slidably mounted in the tube 46 between its ends and the openings 47 and 48. The sealing rings 37 and 38 and strips 39 normally remain in the grooved wall in which they are seated with their outer faces bearing against side walls of the rotor chamber, as shown in Figures 1 and 7, and when they are in this position, outer end portions of the plunger 49 project from the peripheral edge face of the rotor, as shown in Figures 4 and 8. The combustion chambers are located between pairs of radially extending strips 39, as shown in Figure 7, and also between portions of the sealing rings 37 and 38, as shown in Figure 5, and when the sealing rings are forced outwardly by inward movement of the plungers into close contacting engagement with side walls of the rotor chamber, gaseous fuel will be prevented from escaping as it is forced through the passages 34 and also prevented from escaping when it is exploded into the combustion chambers 35. An arcuate cam strip 52 is mounted in a correspondingly shaped pocket 53 formed in the peripheral wall of the stator chamber and in order to accommodate this pocket, portions of the peripheral wall are extended outwardly, as shown at 54. This cam strip carries a shoulder or extension 55 intermediate its length which projects into a recess 56 formed intermediate the length of the pocket 53 and carries mounting screws or stems 57 threaded through bushings 58. By so mounting the cam strip, it may be adjusted to project slightly from the pocket 53 and one end caused to project a greater extent than the other end. It will thus be seen that as the plungers 49 move along the exposed edge face of the cam strip, they will be forced inwardly and the projectors 51 forced outwardly by the tapered head 50 of each plunger to such an extent that the sealing rings and strips will have very tight contacting engagement with walls of the rotor chamber and very effectively prevent escape of the gaseous fuel.

In order to cause rotary motion to be imparted to the rotor when the gaseous fuel is exploded in the chambers 35, the front wall 2 of the motor casing which constitutes the outer or front wall of the rotor chamber, carries a plunger or abutment 59 which is slidably mounted in a pocket 59' formed in the outwardly thickened portion or shoulder 60 of the front wall. This shoulder is also formed with a passage 61 into which extends the spark plug 36 carried by the cap 62 of the shoulder and adjacent its other end, the shoulder or extension is formed with another pocket 63 which slidably receives the plunger or wiper 64 by means of which burnt gases are wiped from the combustion chambers into the exhaust port 65. Sealing strips 66 and 67 which correspond to the sealing strip 31' of the wiper 31 are carried by the abutment 59 and wiper 64 and there have also been provided springs 68 and 69 for urging the abutment 59 and wiper, or vane 64 into the combustion chambers. It should be noted that the projecting end portions of the abutments 59 and 64 are curved, as shown in Figure 7, so that they may move easily along the inner side walls of the combustion chambers towards the left in Figure 7, the combustion chambers being gradually reduced in depth in this direction and having their inner side walls curved so that the abutments will be moved into the pockets 59' and 63. At their other ends, the combustion chambers have abrupt and flat end walls or vanes 35ᵃ which will serve to prevent retrograde rotation of the rotor in case it attempts to turn in the wrong direction. These flat walls also provide very good vane surfaces for the exploding gases to act against as they expand between these walls and the flat side face of the abutment 59 and cause rotary motion to be imparted to the rotor.

When this motor is in use, it is mounted upon a suitable support by brackets 70 projecting from opposite sides of the motor casing. The shaft is turned over in any desired manner to set the motor in operation and as the shaft turns, the pistons 20 of the compressor draw gaseous fuel into the cylinders 18 and then force this fuel under compression into the intermediate chamber 29 in successive charges. The rotor turns with the shaft and the vanes 31 enter the intermediate chamber to force the fuel through the passages 34 and into the combustion chambers 35. As the first charge of fuel enters a combustion chamber and is highly compressed therein, the portion of the combustion chamber between the abutment 59 and the flat end wall 35ᵃ of the chamber will be filled with high compressed gaseous fuel and when the rotor reaches the position indicated by dotted lines in Figure 7 in which the end of the passage 34 facing the intermediate chamber is closed by the inner side wall of the rotor chamber, the spark plug will be energized to ignite this charge of compressed fuel which then expands and acts against the flat faces of the abutment 59 and combustion chamber to impart rotary motion to the rotor. Rotation of the rotor will then be continued by force exerted by the exploding charges and as each combustion chamber reaches a position in which the abutment 64 may be projected into the chamber, this abutment will be forced into the chamber by its spring 69 and the burnt gases will be forced from the combustion chamber through the exhaust port 65. Operation of the motor will continue until the ignition is cut off. It will thus be seen that in this improved motor, the gaseous fuel drawn in by the compressor will first be compressed in the cylinder 18 by the piston 20 and then delivered under pressure into the intermediate chamber and removed from this chamber by the vanes 31 and delivered through the passages 34 into the combustion chambers 35. As the combustion chambers are of a great deal smaller capacity than the intermediate chamber, the compressed fuel removed from the intermediate chamber will be very highly compressed in the combustion chambers and expand with great force when exploded by the spark plug.

Having thus described the invention, what is claimed as new is:

1. In an engine, a casing, a partition dividing said casing to provide a rotor chamber, and a compressor chamber therein, a main shaft extending through said chambers, a rotor and a compressor carried by said shaft and operating in said chambers, said rotor being formed with combustion chambers, an intermediate chamber being provided in the partition between the compressor chamber and rotor and communicating with the compressor chamber to receive charges of fuel in a compressed state from said compressor, means carried by said rotor and operating in the intermediate chamber for recompressing the fuel and transferring fuel in a recompressed state from the intermediate chamber into the combustion chambers in succession, an abutment carried by said casing operating in the combustion chambers in succession, and means for discharging burnt gases from the combustion chambers.

2. In an engine, a casing, a partition dividing said casing to provide a rotor chamber and a compressor chamber, said partition being formed with a chamber intermediate the rotor chamber and the compressor chamber and adapted to receive charges of compressed fuel from the compressor chamber, a main shaft extending through the rotor chamber and the compressor chamber, a rotor and a compressor carried by said shaft and operating in the rotor chamber and the compressor chamber respectively, said rotor being formed with combustion chambers, means carried by said rotor for transferring fuel from the intermediate chamber into the combustion chambers and constituting means for recompressing the fuel prior to transfer, an abutment carried by said casing operating in the combustion chambers in succession, and means for exploding fuel in the combustion chambers in succession, a wall of the casing being formed with an opening constituting an exhaust for the combustion chambers.

3. In a rotary internal combustion engine, a casing, a partition dividing the casing into a rotor chamber and a compressor chamber, a shaft extending through said casing axially of said chambers, a rotor fixed to said shaft and turning in the rotor chamber, said partition being formed with an intermediate chamber communicating with said compressor chamber and closed at one side by said rotor, a compressor in the compressor chamber actuated during rotation of said shaft for successively delivering charges of compressed fuel into the intermediate chamber, an exhaust opening being formed with a wall of the casing, said rotor being formed with combustion chambers, successively communicating with said intermediate chamber and with the exhaust opening during rotation of the rotor, means for transferring fuel from the intermediate chamber into said combustion chambers and constituting means for highly recompressing the fuel before transfer, an abutment carried by said casing working in said combustion chambers, and means for exploding fuel in the combustion chambers.

4. In a rotary internal combustion engine, a casing, a partition dividing the casing into a rotor chamber and a compressor chamber, a shaft extending through said casing axially of said chambers, a rotor fixed to said shaft and turning in the rotor chamber, said partition being formed with an intermediate chamber communicating with said compressor chamber and closed at one side by said rotor, a compressor in the compressor chamber actuated during rotation of said shaft for successively delivering charges of compressed fuel into the intermediate chamber, said rotor being formed with combustion chambers in its side face opposite from the intermediate chamber and with passages leading from the combustion chambers through the rotor and terminating in position to successively communicate with the intermediate chamber during rotation of the rotor, an opening being formed in a wall of the casing and constituting an exhaust for the combustion chambers, means carried by the rotor for highly recompressing and for forcing fuel from the intermediate chamber through the passages into said combustion chambers, an abutment carried by said casing working in said combustion chambers in succession, and means for exploding fuel in the combustion chambers.

5. In a rotary internal combustion engine, a casing, a partition dividing the casing into a rotor chamber and a compressor chamber, a shaft extending through said casing axially of said chambers, a rotor fixed to said shaft and turning in the rotor chamber, said partition being formed with an intermediate chamber communicating with said compressor chamber and closed at one side by said rotor, a compressor in the compressor chamber actuated during rotation of said shaft for successively delivering charges of compressed fuel into the intermediate chamber, said rotor being formed with combustion chambers in its side face opposite from the intermediate chamber and with passages leading from the combustion chambers through the rotor and terminating in position to successively communicate with the intermediate chamber during rotation of the rotor, the casing being formed with an opening constituting an exhaust port for the combustion chambers, vanes carried by said rotor adjacent said passages and moving into the intermediate chamber and along the same for forcing fuel through the passages into the combustion chambers to successively fill the same with highly recompressed fuel as the rotor turns, an abutment carried by said casing and successively urged into said combustion chambers as the rotor rotates, means carried by said casing for exploding fuel in the combustion chambers, and an abutment carried by said casing for entering said combustion chambers and expelling burnt fuel gases through the exhaust port formed in the casing.

6. In a rotary internal combustion engine, a casing, a partition dividing the casing into a rotor chamber and a compressor chamber, a rotary shaft extending through said casing, a rotor carried by said shaft in said rotor chamber, a compressor carried by said shaft in said compressor chamber, a pocket being formed in the partition between the rotor and the compressor adapted to receive charges of fuel in succession from said compressor, said rotor being provided with combustion chambers, and with passages extending through the rotor for communicating with the pocket of the partition in succession, the casing being formed with an exhaust opening to register with the combustion chambers in succession, vanes carried by said rotor for entering said pocket in succession for recompressing fuel therein and transferring fuel under pressure through said passage into the combustion chambers, an abutment carried by said casing and adapted to enter the combustion chambers in succession, and means for exploding fuel in the combustion chambers to impart rotation to the rotor.

7. In a rotary internal combustion engine, a casing, a shaft extending through said casing, a rotor and a compressor fixed to said shaft within the casing, a partition in the casing between the rotor and compressor formed with a pocket having one side closed by the rotor and provided with an inlet leading to the compressor whereby fuel may be forced by the compressor into the pocket, said rotor being provided with combustion chambers at the opposite side of the rotor from the partition and extending circumferentially of the rotor and each having an abrupt end wall and gradually reduced in depth towards its other end, transfer passages for the combustion chambers being formed through the rotor and each extending from the deeper end of a combustion chamber diagonally through the rotor back of the said chamber to register with the pocket as the rotor turns, the casing being formed with an exhaust port to register with the combustion chambers successively as the rotor turns, vanes slidably mounted in the rotor, springs for urging the vanes out of the rotor and into said pocket for recompressing fuel in the pocket and transferring fuel under pressure through the passages into the combustion chambers during rotation of the rotor, an abutment slidably carried by said casing and urged into the combustion chambers, means to explode fuel in the combustion chambers between the piston and abrupt ends of the chambers to impart rotation to the rotor, and an abutment slidably carried by said casing and urged into the combustion chambers to expel burnt gases through the exhaust port formed in the casing.

8. In a rotary internal combustion engine, a casing, a partition dividing the casing into front and rear chambers, a shaft extending through said casing axially of the chambers, a compressor in the rear chamber fixed to said shaft and adapted to be actuated during rotation of the shaft, a rotor in the front chamber fixed to said shaft, the casing being formed with a pocket between the chambers adapted to receive charges of fuel from said compressor, said rotor being provided with combustion chambers having transfer passages successively registering with said pocket during rotation of the rotor, the casing being provided with an exhaust port for registering with the combustion chambers successively during rotation of the rotor, inner and outer sealing rings extending circumferentially about said rotor at opposite sides thereof with the combustion chambers located between the rings, sealing strips extending radially of the rotor at opposite sides thereof between ends of the combustion chambers and overlapped by the rings, pins slidable in said rotor transversely thereof with their outer ends engaging said strips, plungers slidable radially in said rotor with their inner ends engaging the pins for forcing the rings and the strips outwardly into close fitting engagement with the partition and the casing during explosions in the combustion chambers, means for forcing the plungers inwardly, an abutment slidably carried by said casing and urged into said combustion chambers, vanes carried by said rotor between the strips and rings for entering the pocket and recompressing fuel therein and transferring fuel from the pocket through the passages into the combustion chambers, means for exploding fuel in the combustion chambers, an abutment slidably carried by said casing in spaced relation to said abutment circumferentially of the casing and urged into the combustion chambers to expel burnt gases from the combustion chambers through the exhaust port formed in the casing, and means carried by said casing for displacing sealing strips and portions of the sealing rings enclosing a combustion chamber to form a very tight seal during the explosion and removal of burnt gases.

9. In a rotary internal combustion engine, a casing, a partition dividing the casing into front and rear chambers, a shaft extending through said casing axially of the chambers, a compressor in the rear chamber fixed to said shaft and adapted to be actuated during rotation of the shaft, a rotor in the front chamber fixed to said shaft, the partition being formed with a pocket between the chambers adapted to receive charges of fuel from said compressor, said rotor being provided with combustion chambers having transfer passages successively registering with said pocket during rotation of the rotor, the casing having an exhaust port for registering with the combustion chambers successively during rotation of the rotor, inner and outer sealing rings extending circumferentially about said rotor at opposite sides thereof with the combustion chambers located between the rings, sealing strips extending radially of the rotor at opposite sides thereof between ends of the combustion chambers and overlapped by the rings, an abutment slidably carried by said casing and urged into said combustion chambers, vanes carried by said rotor between the strips and rings for entering the pocket and recompressing fuel therein and transferring fuel from the pocket through the passages into the combustion chambers, means for exploding fuel in the combustion chambers, an abutment slidably carried by said casing in spaced relation to said piston circumferentially of the casing and urged into the combustion chambers to expel burnt gases from the combustion chambers through the exhaust port formed in the casing, expanders mounted in said rotor between opposed sealing strips and having actuating members projecting from the peripheral edge face of the rotor, and a cam carried by said casing in position for engagement by the actuating members to individually operate the expanders and distort the strips and portions of the rings enclosing a combustion chamber to form a very tight seal during an explosion and removal of burnt gases.

10. In a rotary internal combustion engine, a casing having front and rear chambers, a shaft extending through said casing axially of the chambers, a compressor in the rear chamber fixed to said shaft and adapted to be actuated during rotation of the shaft, a rotor in the front chamber fixed to said shaft, the partition being formed with a pocket between the chambers adapted to receive charges of fuel from said compressor, said rotor being provided with combustion chambers, a partition dividing the casing into transfer passages successively registering with said pocket during rotation of the rotor, the casing having an exhaust port for communicating with the combustion chambers successively during rotation of the rotor, inner and outer sealing rings extending circumferentially about said rotor at opposite sides thereof with the combustion chambers located between the rings, sealing strips extending radially of the rotor at opposite sides thereof between ends of the combustion chambers and overlapped by the rings, an abutment slidably carried by said casing and urged into said combustion chambers, vanes carried by said rotor between the strips and rings for entering the pocket and recompressing fuel therein and transferring fuel from the pocket through the passages into the combustion chambers, means for exploding fuel in the combustion chambers, an abutment slidably carried by said casing in spaced relation to said piston circumferentially of the casing and urged into the combustion chambers to expel burnt gases from the combustion chambers through the exhaust port formed in the casing, expanders mounted in said rotor between opposed sealing strips, each expander consisting of plungers slidably mounted in a passage formed through the rotor between opposed sealing strips and having beveled inner ends, a push bar slidably mounted in a passage formed radially in the rotor with its outer end projecting from the peripheral edge face of the rotor and its inner end formed with a tapered head, and a cam carried by said casing in position for engagement by the actuating members to individually operate the expanders and distort the strips and portions of the rings enclosing a combustion chamber to form a very tight seal during an explosion and removal of burnt gases.

11. In a rotary internal combustion engine, a casing, a partition dividing the casing into front and rear chambers, a shaft extending through said casing axially of the chambers, a compressor in the rear chamber fixed to said shaft and adapted to be actuated during rotation of the shaft, a rotor in the front chamber fixed to said shaft, the partition being formed with a pocket between the chambers adapted to receive charges of fuel from said compressor, said rotor being provided with combustion chambers having transfer passages successively registering with said pocket during rotation of the rotor, the casing having an exhaust port for registering with the combustion chambers successively during rotation of the rotor, inner and outer sealing rings extending circumferentially about said rotor at opposite sides thereof with the combustion chambers located between the rings, sealing strips extending radially of the rotor at opposite sides thereof between ends of the combustion chambers and overlapped by the rings, an abutment slidably carried by said casing and urged into said combustion chambers, vanes carried by said rotor between the strips and rings for entering the pocket and recompressing fuel therein and transferring fuel from the pocket through the passages into the combustion chambers, means for exploding fuel in the combustion chambers, an abutment slidably carried by said casing in spaced relation to said piston circumferentially of the casing and urged into the combustion chambers to expel burnt gases from the combustion chambers through the exhaust port formed in the casing, expanders mounted in said rotor between opposed sealing strips and having actuating members projecting from the peripheral edge face of the rotor, and a cam carried by said casing and consisting of a bar extending circumferentially of the rotor in position to engage the actuating members to individually operate the expanders, said cam-bar having a block intermediate its length carrying threaded stems engaged through threaded bushings for supporting the cam-bar in adjusted positions.

WALTER H. POTTHAST.